US005101963A

United States Patent [19]

Skarlupka et al.

[11] Patent Number: 5,101,963

[45] Date of Patent: Apr. 7, 1992

[54] VERTICAL LIFT UNIT

[75] Inventors: Joseph H. Skarlupka; Robert J. Teske, both of White Lake; Paul T. Laycock, Elton, all of Wis.

[73] Assignee: Motion Systems, Inc., White Lake, Wis.

[21] Appl. No.: 716,852

[22] Filed: Jun. 17, 1991

[51] Int. Cl.[5] .............................................. B65G 17/18

[52] U.S. Cl. ................................ 198/800; 198/475.1; 198/838

[58] Field of Search ..................... 198/475.1, 799, 800, 198/838, 845

[56] References Cited

U.S. PATENT DOCUMENTS

| | | | |
|---|---|---|---|
| 774,476 | 11/1904 | Hughes . | |
| 799,993 | 9/1905 | Levalley . | |
| 1,135,316 | 4/1915 | Olson . | |
| 1,240,172 | 9/1917 | Breneman | 198/800 X |
| 1,270,001 | 6/1918 | Boos et al. | 198/800 |
| 1,769,348 | 7/1930 | Krummel . | |
| 1,863,484 | 6/1932 | Jones et al. . | |
| 3,369,648 | 2/1968 | Wentz . | |
| 3,593,862 | 7/1971 | Pierson | 214/11 R |
| 3,684,080 | 8/1972 | van Nest | 198/838 X |
| 3,760,934 | 9/1973 | Olson | 198/158 |
| 4,126,218 | 11/1978 | El Taher et al. | 198/325 |
| 4,171,042 | 10/1979 | Meissner | 198/386 |
| 4,199,051 | 4/1980 | Kimberley | 198/482 |
| 4,422,544 | 12/1983 | Alldredge | 198/838 |
| 4,450,951 | 5/1984 | Szanati | 198/482 |
| 4,752,175 | 6/1988 | Lichti | 414/276 |
| 4,846,337 | 7/1989 | Kuhlmann | 198/475.1 |
| 4,987,992 | 1/1991 | Pfleger | 198/475.1 |

*Primary Examiner*—Joseph E. Valenza
*Assistant Examiner*—Tuan N. Nguyen
*Attorney, Agent, or Firm*—Lathrop & Clark

[57] ABSTRACT

A continuous conveyor for elevating articles such as trayed mail has a support frame on which are mounted sprockets which drive two parallel drive chains in vertical planes. A bar is connected between the chains and a carriage is rotatably connected to the bar. The carriage has a plurality of tines which form an elevatable platform. The carriage has a center guide roller which is guided along a closed looped path by vertical guide tracks and two side rollers guided by a separate set of tracks. Spring-loaded members maintain engagement of the side rollers with the track at the lower portion of carriage travel. The apparatus is substantially open at the front and the sides to permit infeed and outfeed from either the front or the sides. The front-loading conveyors have a plurality of sprocket-driven belts and the side loading conveyors have a plurality of driven rollers which interdigitate with the tines of the carriage to permit elevation of articles in a continuous stream.

26 Claims, 9 Drawing Sheets

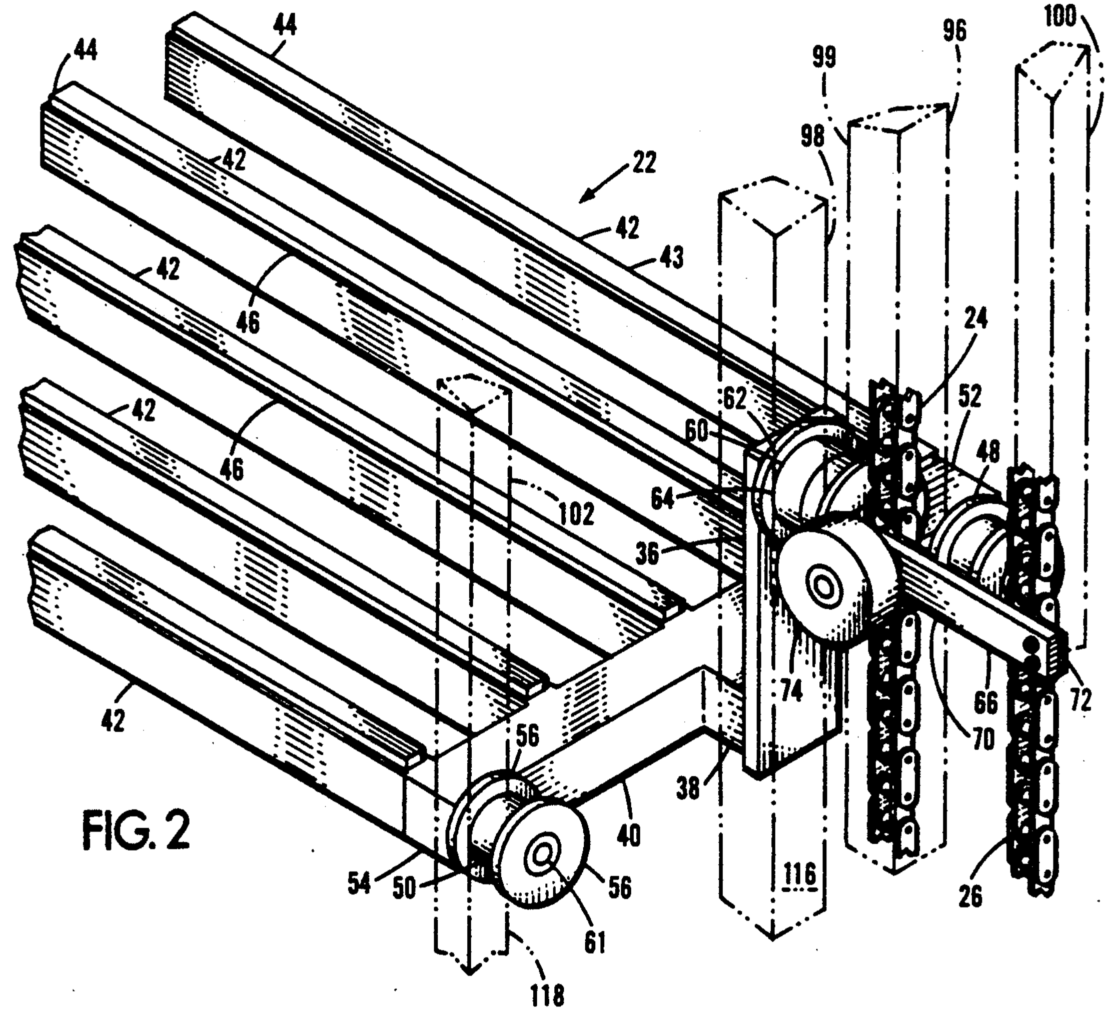
FIG. 2
FIG. 3
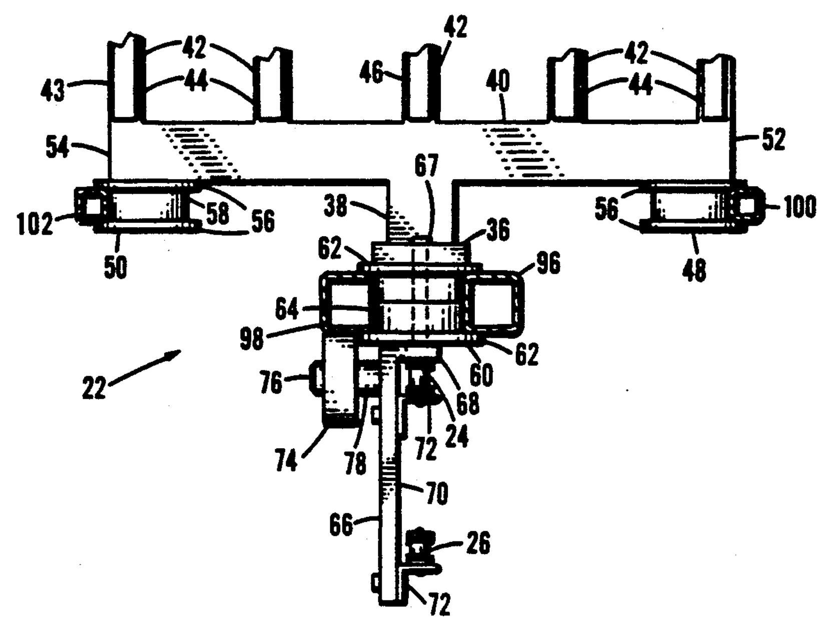

VERTICAL LIFT UNIT

FIELD OF THE INVENTION

The present invention relates to conveyors in general and to apparatus for elevating and lowering articles in particular.

BACKGROUND OF THE INVENTION

In material handling systems in which a stream of discrete articles are transported from one location to another through a number of stations where particular operations are performed upon them, it is often necessary to elevate or lower the articles to reach a desired destination. Ramps composed of moving belts or rollers may be effective in lowering a stream of conveyed articles, but because of the shallow incline required for effective upward conveyance, usually require excessive length when space is at a premium.

Vertical lift devices employing a series of carriages connected to one or more sprocket-driven chains are well known. One type employs a single sprocket-driven chain with evenly spaced carriages rotatably connected to the chain. The carriages have spaced tines which extend outwardly from the chain and which pass through alternately spaced tines placed in the path of the carriage at infeed and outfeed stations. An article is lifted from the infeed station along the upward flight of the carriage and is deposited at an outfeed station at a higher elevation on the downward flight of the carriage. In order to stabilize the carriages it is known to provide rollers which engage in fixed tracks.

In order to avoid excessive loads on the drive chain, vertical lifts have been developed which employ a pair of sprocket driven chains spaced on either side of the carriage with the carriage connected therebetween. In conveyors of this type, however, the carriage tines commonly extend outwardly from the two chains and are limited to restricted infeed and outfeed positions.

Conventional lift apparatus are often extremely noisy and must be carefully supervised because of the tendency of articles to become dislodged from the desired lifting path due to carriage instability. These characteristics are exagerated at higher speeds of lift operation.

In certain installations it is necessary to feed articles in to the front of the lift and feed them out at the side. In other installations it is necessary to feed articles both in and out from the front or both in and out from the sides. Conventional vertical lifts require widely different lift apparatus to fulfill the requirements of these varying directional changes.

What is needed is a vertical lift which will accept articles from either the front or the side and may feed articles out from either the front or the side, which reliably and steadily conveys articles at a desired pace, and which is economical to manufacture and maintain under a variety of conditions.

SUMMARY OF THE INVENTION

The vertical lift unit of this invention is a continuous conveyor for elevating articles such as trayed mail. The apparatus has a support frame on which are mounted sprockets which drive two parallel drive chains in vertical planes. A bar is connected between the chains and a carriage is rotatably connected to the bar. The carriage has a plurality of tines which form an elevatable platform . The carriage has a center guide roller which is guided along a closed looped path by vertical guide tracks and two side rollers guided by a separate set of tracks. Spring-loaded members maintain engagement of the side rollers with the track at the lower portion of carriage travel. The apparatus is substantially open at the front and the sides to permit infeed and outfeed from either the front or the sides or any combination of directions. The front-loading conveyors have a plurality of sprocket driven belts and the side-loading conveyors have a plurality of driven rollers which interdigitate with the tines of the carriage to permit elevation of articles in a continuous stream.

The support frame is composed of three module frames which are interconnected one above the other. The distance between the top and intermediate modules is adjustable to take up slack in the drive chains. The guide tracks are connected between the top and intermediate modules at extendable slip joints that provide bearing surfaces for the rollers at any extension of the joints.

It is an object of the present invention to provide a vertical lift unit which may be supplied with articles from the front or a side and may have articles removed at an altered elevation from either the front or a side.

It is also an object of the present invention to provide a vertical lift unit which smoothly transports articles while retaining those articles in a horizontal orientation.

It is another object of the present invention to provide a vertical lift unit which occupies a minimum volume.

It is a further object of the present invention to provide a vertical lift unit which may be easily adapted to different loading and unloading conditions.

It is an additional object of the present invention to provide a vertical lift unit which may be easily adjusted to accommodate wear in its drive chains.

It is a further additional object of the present invention to provide a chain-driven vertical lift unit which avoids excessive bending moments on the chains.

It is yet a further object of the present invention to provide a vertical lift unit which may conveniently be manufactured and transported as discrete modules.

It is yet another object of the present invention to provide a vertical lift unit which is not unduly noisy in operation.

It is a still further object of the present invention to provide a vertical lift unit which may operate at high speeds.

Further objects, features and advantages of the invention will become apparent from the following detailed description when taken in conjunction with the accompanying drawings.

BRIEF DESCRIPTION OF THE DRAWINGS

FIG. 2 is an isometric view of a carriage of the vertical lift unit of FIG. 1.

FIG. 3 is a top plan view of the carriage of FIG. 2.

DESCRIPTION OF THE PREFERRED EMBODIMENT

Figure 1:
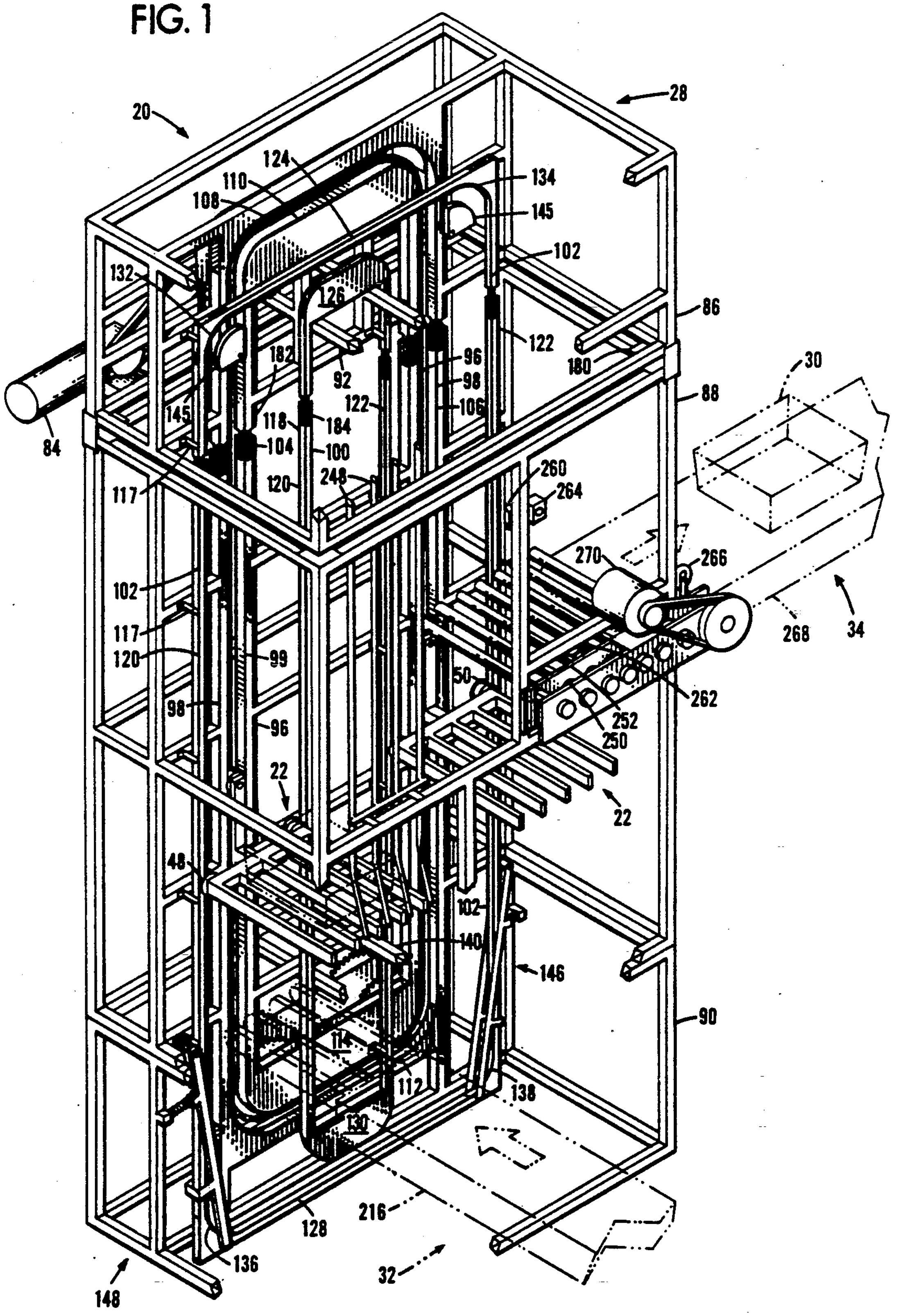
FIG. 1 is an isometric view of the vertical lift unit of this invention.

Referring more particularly to FIGS. 1–20, wherein like numbers refer to similar parts, a vertical lift unit 20 is shown in FIG. 1. The vertical lift unit 20 has a plurality of carriages 22 which are pivotally attached to two sprocket-driven chains 24, 26 and which move along a continuous path defined by guide roller tracks which are mounted to a modular support structure 28. Articles 30 are conveyed to an upwardly moving carriage 22 at the infeed station 32 and are conveyed away from the same carriage on its downward flight at the outfeed station 34.

Figure 4:
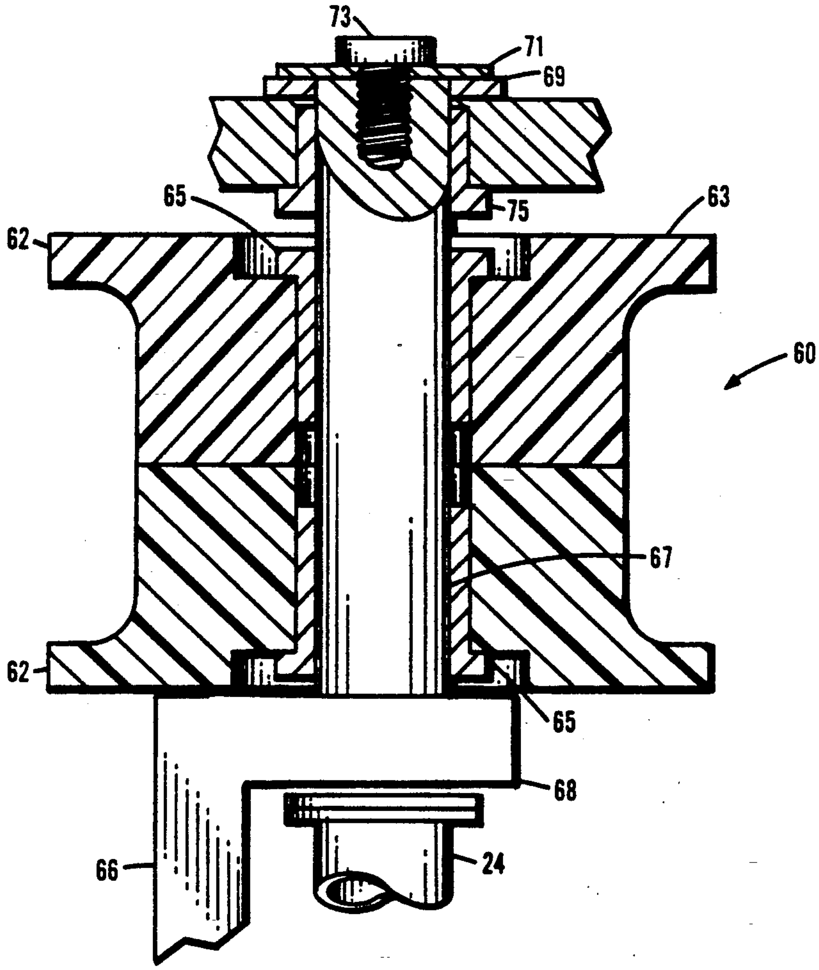
FIG. 4 is a cross-sectional view of the carriage of FIG. 3 taken through the center of the center guide roller.

As shown in FIGS. 2, 3, and 4 each carriage 22 has a vertical bar 36 of one half inch plate steel which is attached by a spacer tube 38 to a horizontal platform bar 40 formed of 1″×2″ steel bar stock. Five tines 42 extend perpendicularly from the horizontal bar 40. The tines 42 are one by two inch rectangular steel tubing and are welded to the horizontal bar 40. The tines 42 form a horizontal platform 43 which defines a horizontal plane for receiving the articles 30 to be conveyed.

Die-cut strips 44 of high density closed-cell foam ¾″ wide and ½ thick are adhesively attached to the top surfaces 46 of the tines 42. The foam strips 44 reduce the noise produced when the tines 42 make contact with an article 30 and contribute to the stability of an article 30 once it is engaged by the tines 42 of the carriage 22.

Figure 5:
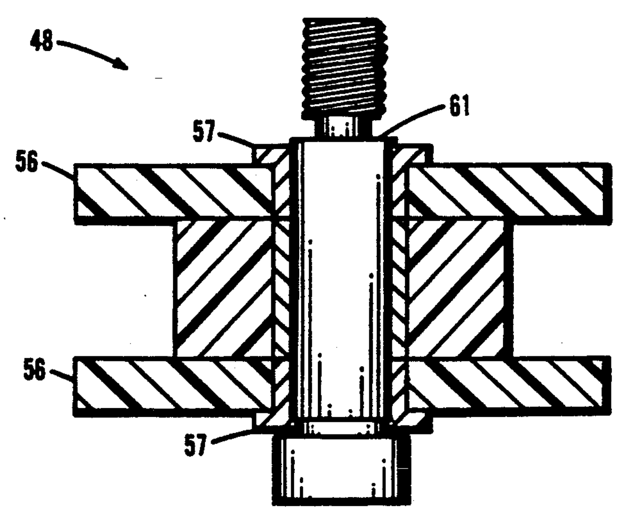
FIG. 5 is a cross-sectional view of a three part side roller of the carriage of FIG. 3.

Three-part plastic side rollers 48, 50 are rotatably mounted to the left side 52 and the right side 54 of the carriage horizontal platform bar 40 as shown in FIG. 3. Each side roller 48, 50 has two flanges 56 formed of 100 mm diameter plastic stock and fitted with a bronze bushing 57. As shown in FIG. 5, the flanges 56 are mounted on the shank of a bolt 61 which is threaded into the horizontal platform bar 40. The flanges 56 are spaced apart by an annular interior 58 which is formed of 65 mm diameter plastic stock and which is fitted with a bronze bushing 57. The flanges 56 and interior 58 of each side roller 48, 50 are thus free to rotate at different rates. The side rollers 48, 50 rotate in a vertical plane which is generally parallel to the vertical bar 36 about a rotational axis which is generally parallel to the tines 42. The two side rollers 48, 50 and flanges 56 are spaced by the annular interior 58 to fit on either side of a 1″ square tubular track. The side rollers 48, 50 serve to stabilize the carriage platform 43 in a horizontal plane and restrict the tipping of the platform 43.

The spacer tube 38 spaces the platform bar 40 from the vertical bar 36 to allow the side rollers 48, 50 to rotate in a plane which is spaced from the front of the vertical bar 36.

A single center guide roller 60, shown in FIG. 4, is rotatably mounted to the vertical bar 36 above the platform 43. The two part center guide roller 60 also rotates in a vertical plane about an axis which extends perpendicular to the vertical bar 36. Each part 63 of the center guide roller 60 has a flange 62 integrally formed with a roller interior 64. Each part 63 has a bronze bushing 65. The two parts of the center guide roller 60 are mounted on a shaft 67 which is approximately ¾″ in diameter and which is welded to the L-shaped bar 66. The vertical bar 36 of the carriage 22 is rotatably mounted to and suspended by the shaft 67. The vertical bar 36 has a bushing 75 and the shaft 67 is fastened by a bronze thrust washer 69, a steel thrust washer 71, and a low head hex socket head screw 73.

The center guide roller 60 is thus also rotatably connected to an L-shaped bar 66. The bar 66 has a segment 68 which extends in a plane parallel to the vertical bar 36 to which the roller 60 is connected and a chain attachment segment 70 which extends perpendicularly to the roller attachment segment 68. Two attachment links 72 are rigidly fastened to the chain segment 70 of the bar 66 and each attachment link 72 forms a portion of a drive chain 24, 26. The center guide roller 60 is mounted to the roller segment 68 of the bar 66 such that the axis of rotation of the roller 60 intersects the center lines of the chains 24, 26.

Figure 9:
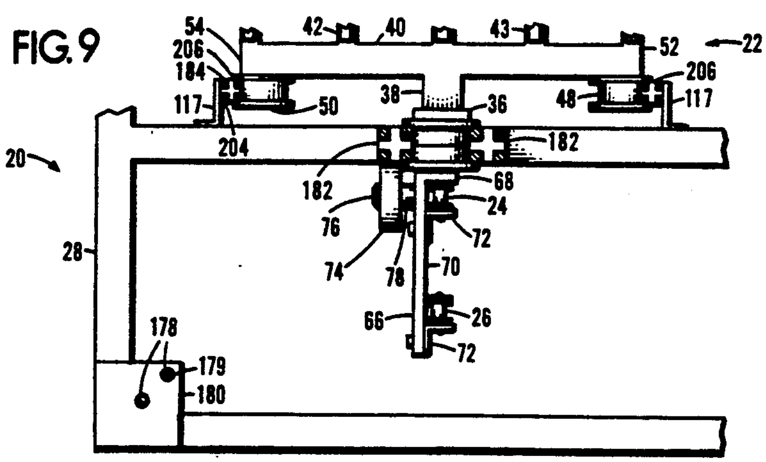
FIG. 9 is a cross-sectional view of the vertical lift unit of FIG. 6 taken along section line 9—9.

As shown in FIGS. 3 and 9, a 3″ bearing wheel 74 is rotatably mounted to a stud 76 which extends perpendicularly to the chain segment 70 of the bar 66 on the side of the segment 70 opposite the attachment links 72. The bearing wheel 74 is spaced from the bar 66 segment 70 by a spacer 78. The bearing wheel 74 rotates on the stud 76 in a plane perpendicular to the plane of rotation of the center roller 60 and is located on the bar 66 such that the wheel 74 does not interfere with the center roller 60 and is in position to engage with the same track which guides the center roller 60.

Figure 6:
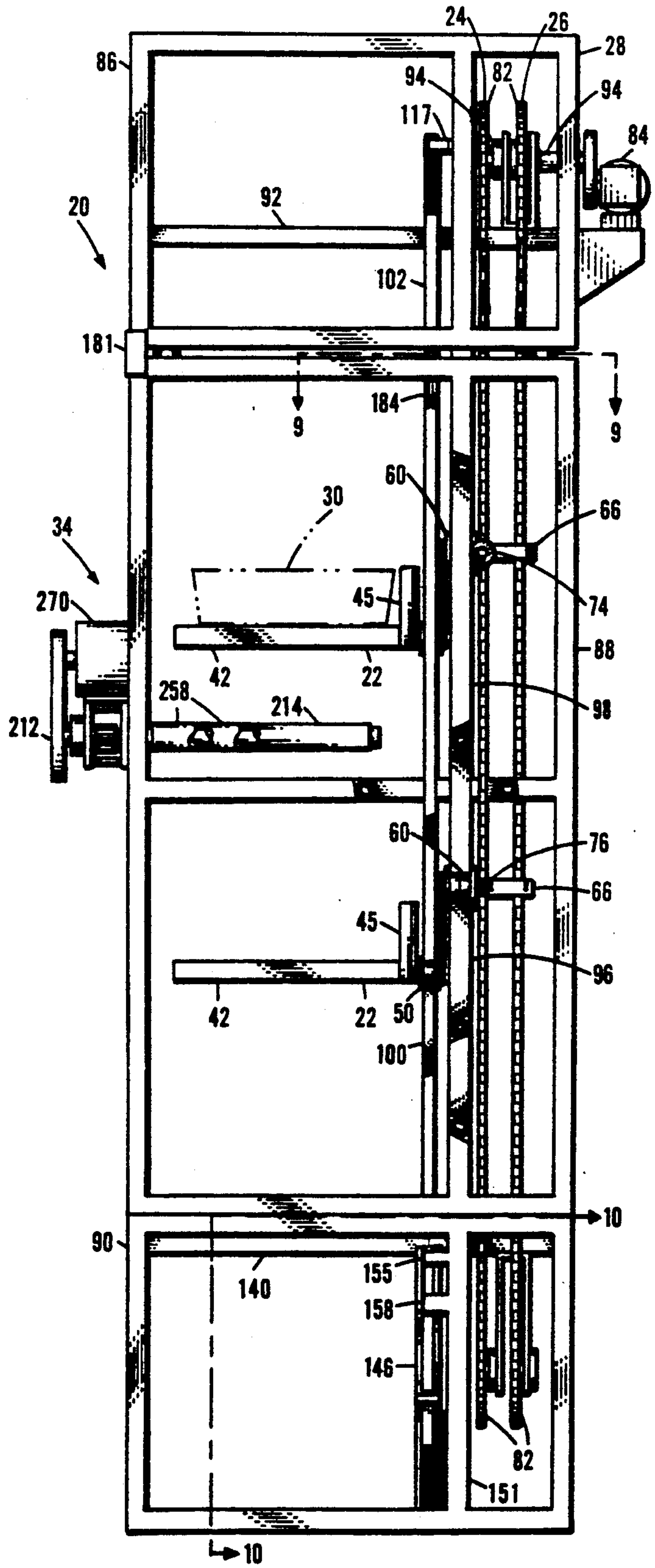
FIG. 6 is a side elevational view of the vertical lift unit of FIG. 1 outfitted with carriages with backstops.

As shown in FIG. 6, the carriages 20 may have vertical backstop plates 45 attached to the platform bar 40 to prevent articles from extending beyond the platform 43.

Figure 8:
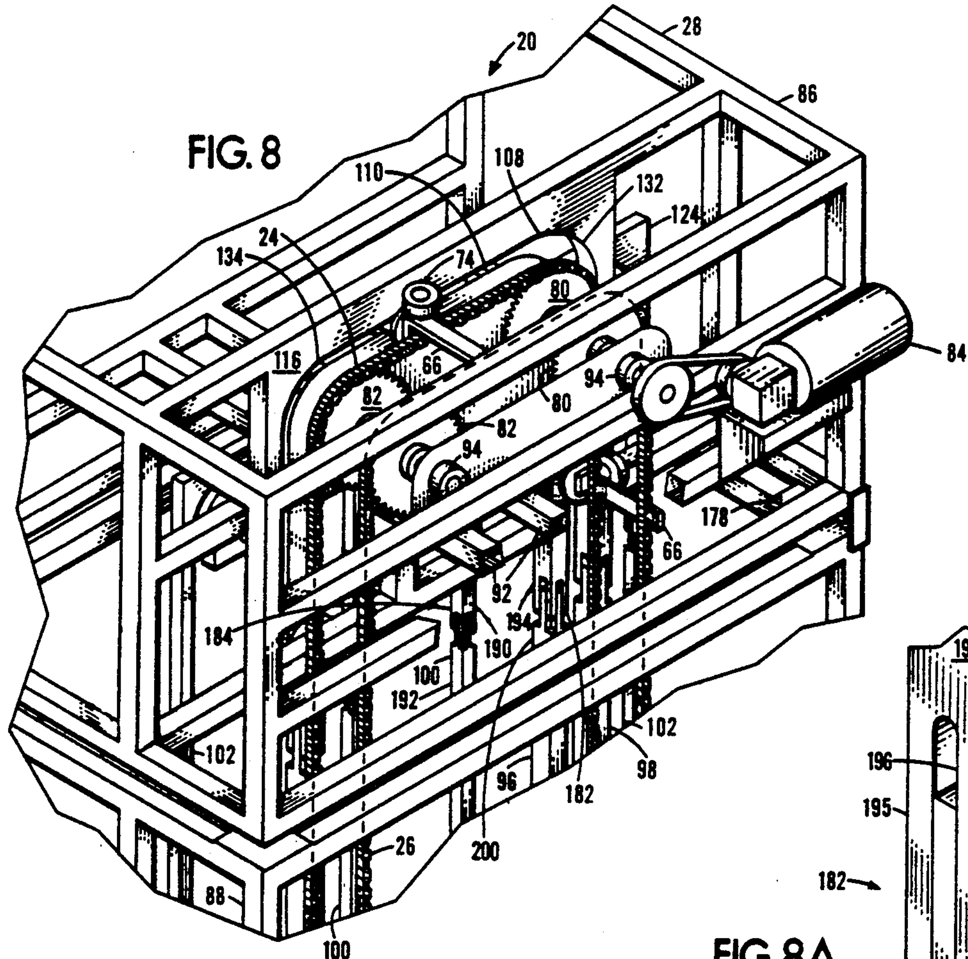
FIG. 8 is a fragmentary rear isometric view of the vertical lift unit of FIG. 1 with the carriages ommitted for clarity.

As shown in FIG. 6 a number of carriages 22 are connected to flexible drive members, which are the two chains 24, 26. The carriages may be spaced at any desired distance from one another, for example on 3′1″ centers. The drive chains 24, 26, best shown in FIG. 8, are formed of conventional #80 chain links and are continuous closed loops. The vertical lift unit has eight sprockets 80, 82. Four sprockets 80, 82 engage each chain 24, 26. The chains 24, 26 travel in parallel vertical planes and the centers of the chains are spaced six inches apart. Four pairs of #80, 38-tooth sprockets approximately 12" in diameter are mounted coaxially to the support structure 28. Three of the pairs of sprockets 82 are driven sprockets, and one pair are drive sprockets 80. The drive sprockets 80 are in turn driven by an electric motor 84 mounted to the support structure 28. The motor 84 drives the drive sprockets 80 through a POLY CHAIN belt, such as the POLY CHAIN GT belt manufactured by Gates. So that the chains will be kept under tension, the drive sprockets 80 are located at the top of the support structure 28 and are located adjacent the upwardly moving flight of the chains.

As shown in FIGS. 1 and 6, the support structure 28 has three discrete, rigidly connected, frame modules 86, 88, 90. The inter-connected modules form a rigid, stable, and open framework which supports the sprockets 80, 82, the guide tracks which guide the path of the carriage 22, and the infeed and outfeed stations 32, 34. Each module 86, 88, 90 is constructed of welded 2" square tubular steel which forms a generally boxlike frame.

Each module 86, 88, 90 has interconnected horizontal and vertical members which support specific mechanical elements of the vertical lift unit 20. The top module 86 has braces 92 which support sprocket bearings 94. The motor 84 is also connected to the top module 86. The top module 86 provides support for the roller guide tracks which change the direction of the carriages 22 from an upward path to a downward path.

The intermediate module 88 is connected beneath the top module 86 and the infeed station 32 and the outfeed station 34 in the path of the carriages 22. The location of the infeed and outfeed stations will be determined by the geometry of a particular application, but in the illustrated vertical lift unit 20, the intermediate module 88 supports the infeed station 32 along the upward path of the carriages 22 and the outfeed station 34 along the downward path of the carriages 22. The intermediate module 88 may be selected of any desired height to accommodate the specific elevating needs of a particular vertical conveyance application.

The bottom module 90 is mounted directly to the shop floor beneath the intermediate module 88 and provides support for the guide tracks and associated mechanisms for returning the carriages in their downward flight to an upward lifting flight.

The module construction of the vertical lift unit 20 not only provides for ease of transport and assembly of the apparatus, but yields significant economies in manufacture. Whatever the specific needs of a particular application in terms of lift height, and infeed and outfeed conveyor orientation, the structure of the top and bottom modules 86, 90 will remain substantially unchanged. Thus economies of scale may be obtained in the manufacture of these two modules. The intermediate module is that portion of the vertical lift unit 20 which may be tailored to specialized applications.

To ensure a smooth flow of articles 30 and repeatable performance at high conveyance rates, the carriage 22 and the carriage platform 43 in particular must at all times be maintained in a horizontal orientation despite all changes in vertical elevation and side-to-side movement. To achieve this positional control, while at the same time avoiding excessive loads on the chains 24, 26, guide tracks are mounted to the support structure which correspond to each of the guide rollers 48, 50, 60, and bearing wheels 74 of the carriages 22. Center guide roller tracks 96, 98 engage with the center guide rollers 60 of the carriages 22 and define a looped center roller guideway 99 which corresponds to the path of the chains 24, 26. Side roller tracks 100, 102 engage the left and right side rollers 48, 50 of the carriages 22.

The carriage center guide rollers 60 are guided by an inner center guide track 96 and an outer center guide track 98. The center guide roller tracks 96, 98 have upwardly extending portions 104 and downwardly extending portions 106 which are formed of two inch square steel tubing. In the top module 86 the upwardly extending portions 104 are joined to the downwardly extending portions 106 by horizontal portions 108, 110. The upwardly and downwardly extending portions 104, 106 of the center tracks are joined in the bottom module 90 by horizontal track portions 112, 114. The horizontal portions 108, 110, 112, 114 of the center guide tracks 96, 98 have radiused inner corners 111, shown in FIGS. 15 and 16, and radiused outer corners 113, shown in FIGS. 13 and 14. The radiused corners 111, 113 are joined to the steel tubing of the upwardly and downwardly extending vertical portions of the track to provide substantially uninterrupted track surfaces. The radius of the guideway 99 defined by the horizontal portions is approximately the same as the radius of the sprockets 80, 82.

As the carriages 22 travel around the vertical lift unit 20, the center guide rollers 60 make a complete circuit of the center roller guideway 99. The flanges 62 of the center guide roller 60 have a diameter greater than the width of the center roller guideway 99 and are spaced from one another a distance only slightly greater than the width of the tracks 96, 98. The flanges 62 limit the forward and rearward motion of the bar 66 which is connected to the drive chains 24, 26. The annular interior 64 of the center guide roller 60 is slightly smaller in diameter than the width of the center roller guideway 99 and acts to restrict the side-to-side motion of the bar 66 and hence the carriage 22.

It should be noted that when the carriage 22 and any articles 30 supported thereon are traveling vertically, the full vertical load of the carriage and articles is transmitted to the drive chains 24, 26 which, because of their link construction, are well adapted to sustaining such tensile loads. However, as the carriage 22 moves horizontally the center guide roller 60 engages with the inner track horizontal portion 110 in the top module 86 and the outer track horizontal portion 112 while moving through the bottom module 90. When engaged with the horizontal portions of the center guide roller track 96, 98, the vertical loads are carried through the center guide roller 60 to the support structure 28. Thus, loads perpendicular to the center line of the drive chains 24, 26 are substantially reduced along the horizontal portions of drive chain travel.

The rear surface 116 of the outer center guide roller track 98 serves as a load-bearing surface for the bearing wheel 74 which is connected to the bar 66 and the carriage 22. The bearing wheel 74 resists the tendency of the carriage 22 to pivot about the first chain 24 due to cantilevered loads carried on the platform 43 and transfers these loads to the guide roller track 98. As a consequence, bending moments on the drive chains 24, 26 are greatly reduced.

The side roller tracks 100, 102 are spaced by brackets 117 approximately one and one half inch forwardly of the center guide roller tracks 96, 98. This spacing provides clearance for the rear flanges 56 of the side rollers 48, 50. The side tracks 100, 102 engage the left and right side rollers 48, 50 which are mounted to the platform bar 40 of each carriage 22. Together the side roller tracks 100, 102 define a side roller guideway 118. The side roller tracks 100, 102 restrain the carriage platform 43 from sideways motion while the carriage is traveling upwardly and downwardly and prevents tipping of the platform 43 when the carriage moves horizontally.

The side roller guide tracks 100, 102 have upwardly extending portions 120 and downwardly extending portions 122 which are formed of 1" square steel tubing. Those portions 120, 122 of the side roller guide tracks 100, 102 which extend vertically are spaced from one another a distance approximately equal to the spacing between the outer surfaces of the annular interior portions 58 of the left and right side rollers 48, 50. The horizontal portions 124, 126 at the top of the side roller guide track and the horizontal portions 128, 130 at the bottom of the side roller guide track are spaced vertically from one another approximately the diameter of the side roller annular interiors 58. Hence the side roller guideway 118, while it is a continuous looped path, is nearly as wide as the carriage platform 43 throughout its vertical portions but narrows down to the width of a center roller interior 64 at its horizontal portions.

Figure 17:
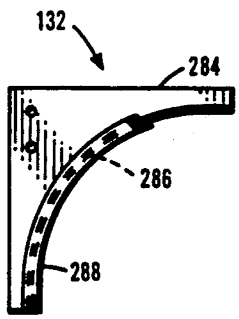
FIG. 17 is a front elevational view of an outer radiused corner of the vertical lift unit of this invention.
Figure 18:
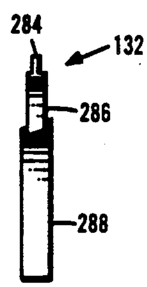
FIG. 18 is a side elevational view of the corner of FIG. 17.
Figure 19:
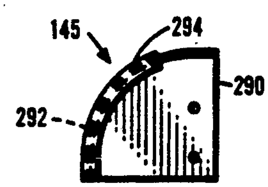
FIG. 19 is a front elevational view of a radiused corner of the inner side roller guide track of the vertical lift unit of this invention.
Figure 20:
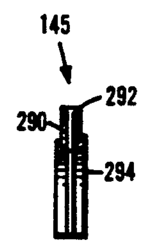
FIG. 20 is a side elevational view of the corner of FIG. 19.

The horizontal portions 124, 128 of the outer side roller guide track 102 are also formed of 1" steel tubing which is joined through the vertical portions 120, 122 of the outer side roller track 102 by radiused corners 132, 134, 136, 138 shown in FIGS. 17 and 18. The horizontal portions 126, 130 of the inner side roller track 100 have radiused corners 145 shown in FIGS. 19 and 20. The loads on the upper portions of the inner side roller track 100 in the top module 86 are carried through the braces 92 to the top module 86. The loads of the lower portions of the inner side roller track 100 are carried on the bottom module braces 140.

The radiused corners 111, 113, 132, 134, 136, 138, 145, shown in FIGS. 13-20, are preferably formed of steel plate 272, 278, 284, 290, with a curved steel rib 274, 280, 286, 292 attached to the plate for stiffening of the plate, and having a molded square tubular urethane track section 276, 282, 288, 294 attached to the plate around the rib. For clarity in the remaining views, the radiused corners have been shown as simple curved portions of the track.

As the center guide roller 60 is carried upwards by the drive chains 24, 26 along the center roller guideway 99, the platform 43 of the carriage 22 is stabilized by the left and right side rollers 48, 50 engaging with the upwardly extending portions 120 of the side roller track. The side roller flanges 56 are spaced on either side of the side track and the side roller interior 58 may engage in rolling contact with the track. As the carriage 22 reaches the top of its circuit, the downward loads on the carriage platform 43 retain the right side roller 50 in engagement with the inner horizontal portion 126 at the top of the side roller guideway 118. Tipping of the platform 43 towards the center of the vertical lift unit 20 is restricted by the radiused corners 132 of the outer guide track 102. In a similar manner, gravitational loads maintain the left side roller 48 in engagement with the radiused portion of the inner horizontal portion 126 as the carriage 22 begins its descent.

As the carriage 22 reaches the lowest point of its travel, gravity no longer works to retain the side rollers 48, 50 in engagement with the inner side roller track 100. To overcome the tendency of the platform bar 40 to tilt and the inner side roller to come out of engagement with the radiused corners 142, 144 of the lower horizontal portion 130 of the inner side roller track 100, two spring-loaded linear members 146, 148, shown in FIGS. 10 and 11, are mounted to the support structure 28 in the bottom module 90 to retain both side rollers 48, 50 in engagement with the side roller guide tracks 100, 102.

Figure 11:
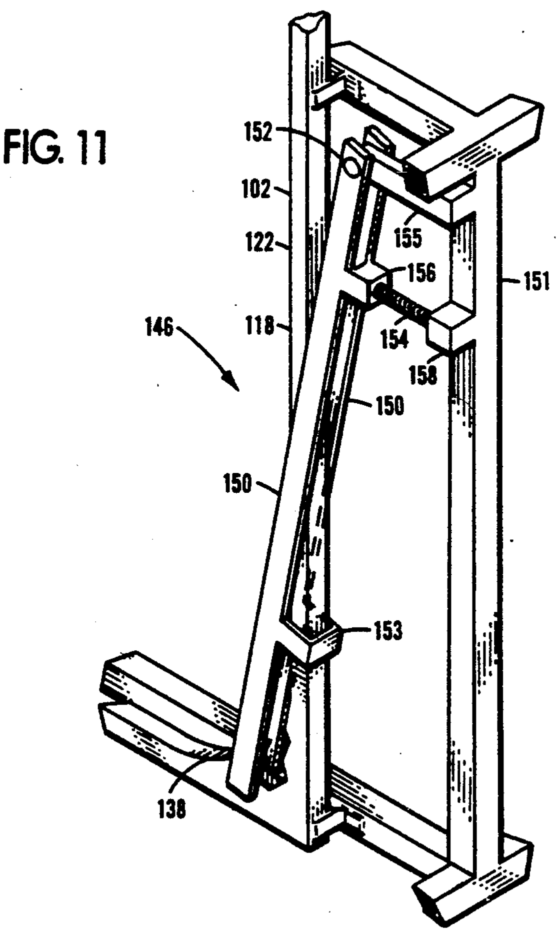
FIG. 11 is an isometric view of the downward engaging spring-loaded member of FIG. 10.
Figure 12:
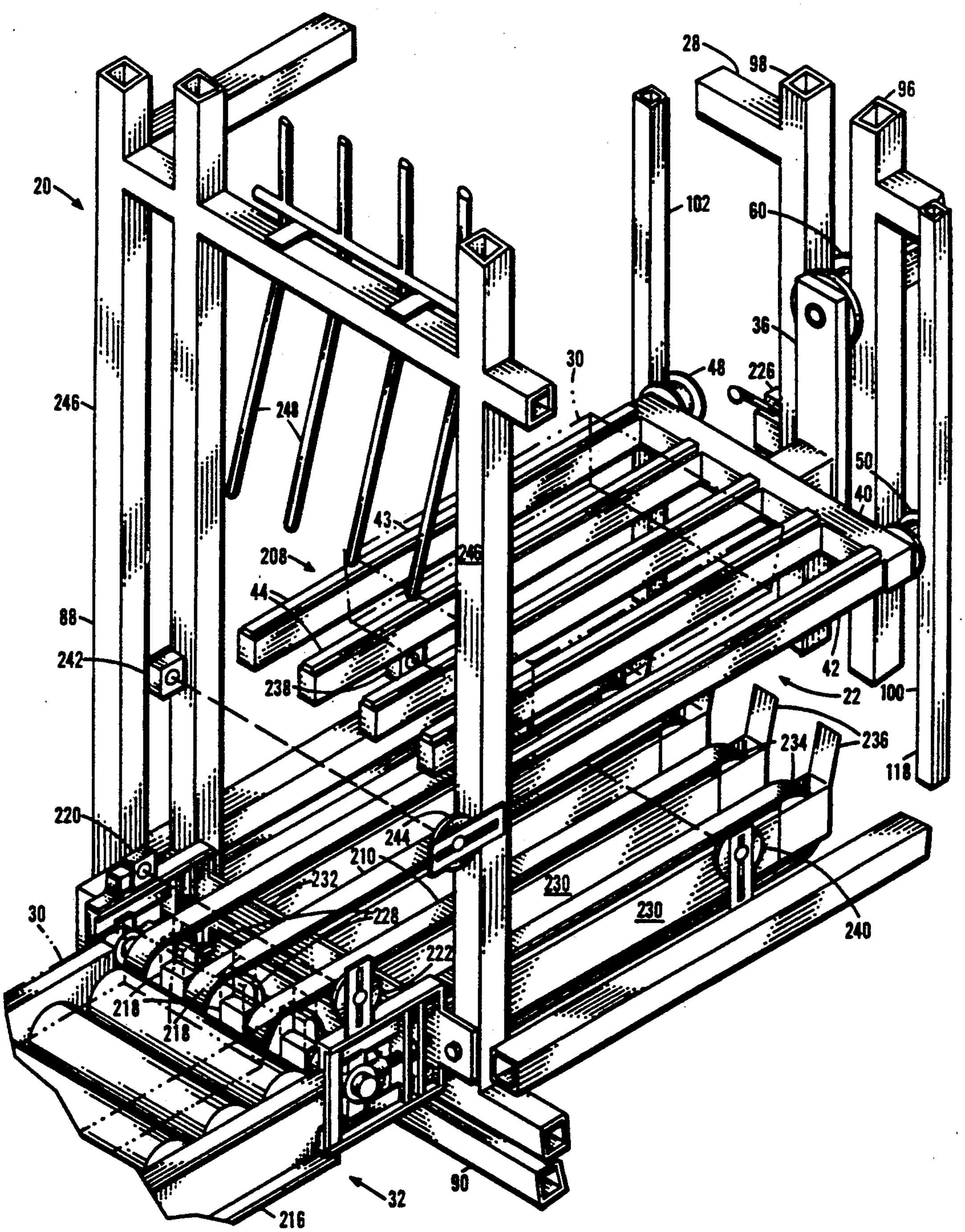
FIG. 12 is an isometric view of the infeed portion of the vertical lift unit of FIG. 1.
Figure 13:
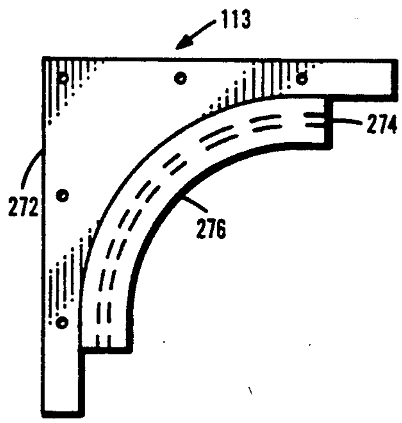
FIG. 13 is a front elevational view of a radiused corner of the center guide roller outer track of a vertical lift unit of this invention.
Figure 14:
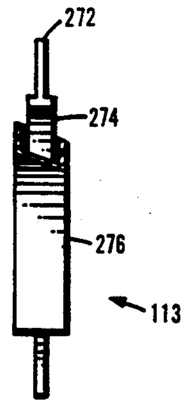
FIG. 14 is a side elevational view of the corner of FIG. 13.
Figure 15:
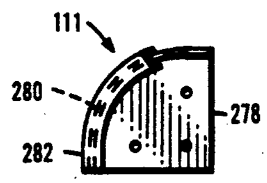
FIG. 15 is a front elevational view of a radiused corner of the center guide roller inner track of the vertical lift unit of this invention.
Figure 16:
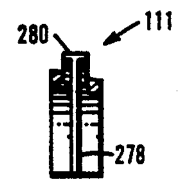
FIG. 16 is a side elevational view of the corner of FIG. 15.

The downward engagement spring-loaded member 146, shown in FIG. 11, has two steel bar stock segments 150 which are joined by a U-shaped bracket 153. The member 146 is pivotally connected to a bracket 155 which extends from a vertical member 151 of the bottom module frame 90 at a bearing 152 above the radiused corner 138 of the outer side roller track 102. The segments 150 are spaced on either side of the downwardly extending portion 122 of the outer side roller track 102 so that the member 146 may be pivoted into the side roller guideway 118 by a spring 154 which is compressible between a bracket 156 which is mounted to the segments 150 and a bracket 158 mounted on the vertical member 151.

Figure 10:
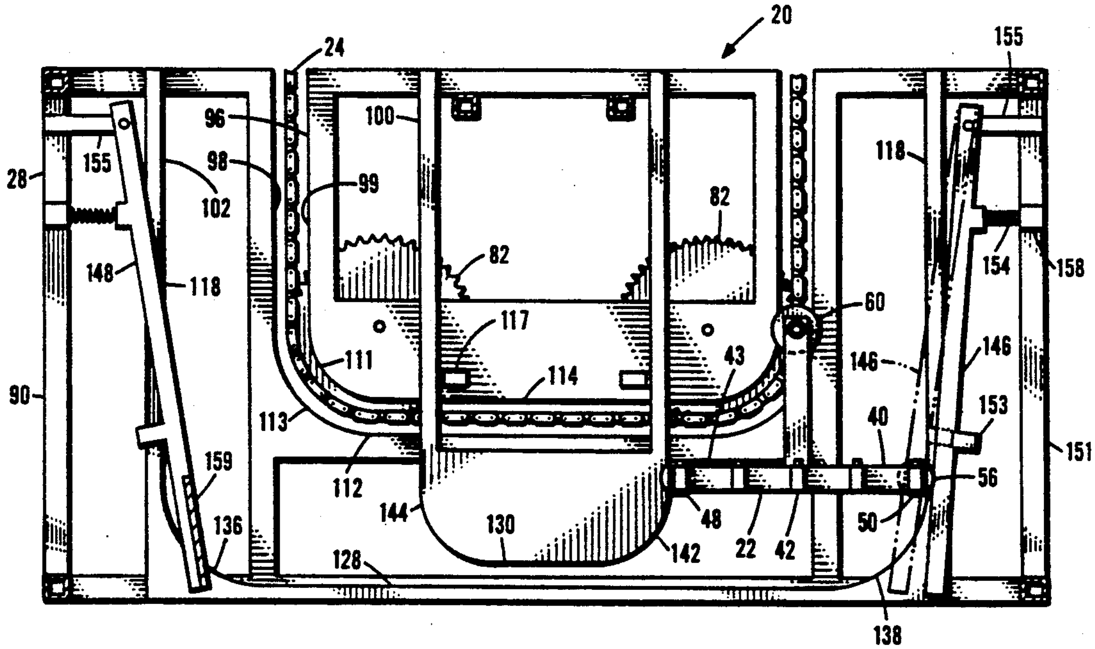
FIG. 10 is a cross-sectional view of the vertical lift unit of FIG. 6 taken along section line 10—10 illustrating a carriage traveling downwards.

When a carriage is not engaged against the spring-loaded member 146, as shown in phantom lines in FIG. 10, the segments 150 are disposed within the downward leg of the side roller guideway 118. When the carriage 22 descends, the right side roller 50 engages against the spring-loaded member 146. The flanges 56 of the side roller 50 engage against the spaced segments 150 of the spring-loaded member 146 and as the carriage 22 is driven lower by the drive chains 24, 26 the segments 150 are pushed out of the side roller guideway 118 as shown in FIG. 10. The spring-loaded member 146 thus applies a horizontal force against the right side roller 50 which forces the opposing side roller 48 into engagement with the curved portion of the radiused corner 142 of the inner side track 130. The spring-loaded member 146 thus insures that the left guide roller 48 remains engaged against the inner side roller track 100 and that the platform 43 does not tip.

The carriage 22 next travels along the lower horizontal portion 128 of the side roller track 102 and then begins its upward travel within the side roller guideway 118. The spring-loaded member 148, is a mirror image of the spring-loaded member 146 and acts to retain engagement of the side rollers in the transition from horizontal motion of the carriage 22 to vertical travel. For abatement of the impact noise of the carriage 22 making contact with the member 148 as it moves horizontally, a urethane pad 159 is attached to the member where it contacts the moving carriage.

As the carriage 22 moves upward the left side roller 48 comes into engagement with the spring-loaded member 148. The flanges 56 of the left side roller 48 engage the member 148, and as the carriage 22 is lifted by the chains 24, 26 the spring-loaded member 148 is pushed out of the side roller guideway 118. The member 148 exerts a horizontally directed force on the left side roller 48. This force acts through the platform bar 40 and forces the opposing right side roller 50 into engagement with the radiused corner 144 of the inner side track horizontal portion 130. The spring-loaded member 148 thus retains the side rollers 48, 50 in engagement with both the inner and outer side tracks 100, 102 as the carriage makes its transition from horizontal to upward travel. The spring-loaded members 146, 148 function in a similar manner when the direction of carriage motion is reversed. Although to retain the noise-abating feature the urethane pad would need to be on the spring-loaded member which contacts two horizontally moving carriages.

Drive chains composed of a plurality of connected links have a tendency, after extended usage, to wear and exhibit an increase in length. If this increased length is not accommodated slack will be introduced into the drive chains and effective operation of the conveyor will be jeopordized. As shown in FIG. 9, the vertical lift unit 20 has a plurality of jack bolts 178 located in each of the corners where the top module 86 is connected to the intermediate module 88. The jack bolts 178 extend through threaded holes 179 in corner plates 180 affixed to the top intermediate modules 86, 88 such that rotation of the jack bolts 178 will serve to elevate the top module 86 and the connected sprockets 80, 82 above the intermediate module 88. By thus elevating the upper four sprockets, any slack introduced into the drive chains 24, 26 by wear may be taken up. Corner brackets 181 are welded to opposite corners of the top module 86 to align it with the corners of the intermediate module 88.

When the top module 86 is elevated above the intermediate module 88, means must be provided for increasing the length of the guide roller tracks 96, 98, 100, 102 which have portions which are rigidly connected to both the top and intermediate modules 86, 88. This means for extension of the guide tracks is provided by slip joints 182, 184 in the guide tracks.

Figure 8A:
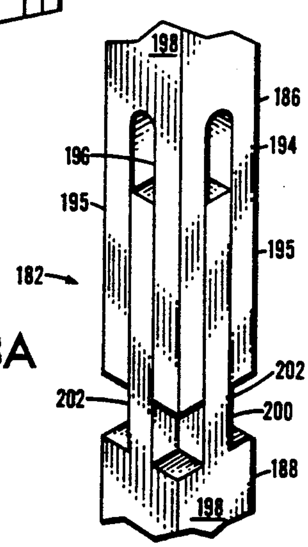
FIG. 8A is an enlarged fragmentary view of a single slip joint of the apparatus of FIG. 8.

The slip joints 182, 184, shown in FIGS. 8, 8A, and 9, ensure the smooth and uninterrupted travel of the carriage guide rollers 48, 50, 60 and the bearing wheel 74 by retaining a portion of track which has an uninterrupted smooth exterior which comes into contact with the rollers.

As shown in FIG. 8, the center guide roller tracks 96, 98 have four upper portions 186 which are connected to and extend from the top module frame 86. Lower portions 188 of the center guide roller tracks 96, 98 extend upwardly from the intermediate module frame 88. The center guide roller track upper portions 186 are engaged with the center guide roller track lower portions 188 by slip joints 182. The side roller tracks 100, 102 have upper portions 190 which extend downwardly from the top module 86 and lower portions 192 which extend upwardly from the intermediate module 88 which are engaged with the upper portions 190 at slip joints 184.

As best shown in FIG. 8A, each slip joint 182, 184 has two segments which are machined from solid bar stock and which are welded to the square steel tubing of the upper and lower track portions. Each upper slip joint segment 194 has four protruding corner extensions 195 which are generally square in cross section. Each corner extension 195 has exterior surfaces 196 which are substantially coplanar with the exterior surface 198 of the track 186. The lower slip joint segment is a cross-shaped protrusion 200 which extends from the lower track portion 188 beneath the corner extensions 195. As shown in FIG. 9, the cross-shaped protrusion 200 is dimensioned to fit between the corner extensions 196. The exterior surfaces of the lower slip joint protrusion 200 are substantially coplanar with the track exterior surfaces 198 from which the protrusion extends. The corner extensions 196 of the one track 186 are engaged with the cross-shaped protrusion 200 on the corresponding roller track 188 such that the engaged upper and lower tracks 186, 188 provide exterior surfaces 198 with coplanar portions adapted for smooth engagement of the center guide roller 60 and the bearing wheel 74. The center roller annular interior 64 is sufficiently wide that at any point along the slip joint the center roller interior 64 may engage against two corner extension 195 exterior surfaces 196, one protrusion exterior surface 202, or a combination of all three.

As shown in FIGS. 8 and 9, the slip joints 184 which connect the side roller track upper and lower portions 190, 192, although having a smaller cross section than the center roller track slip joints 182, have similar corner extensions 204, and protrusions 206.

Figure 7A:
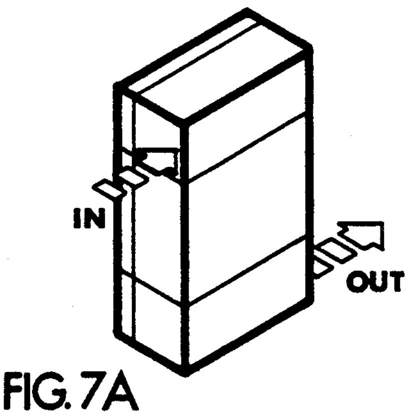
FIG. 7A–H are schematic views of the vertical lift unit of this invention illustrating alternative configurations.
Figure 7B:
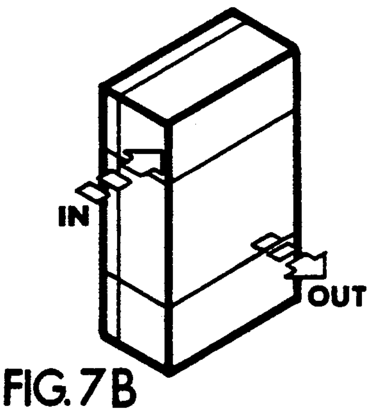
Figure 7C:
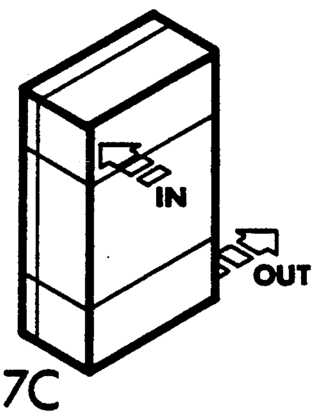
Figure 7D:
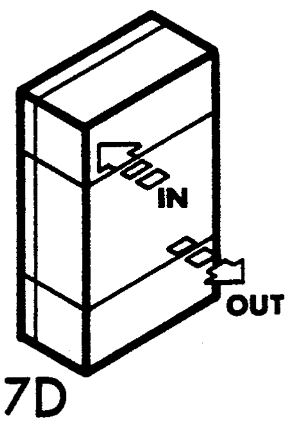
Figure 7E:
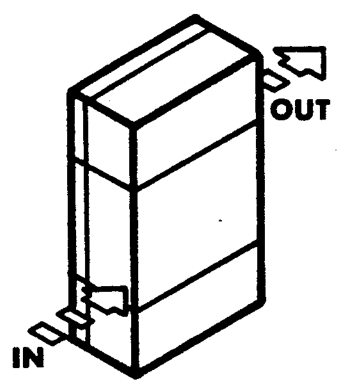
Figure 7F:
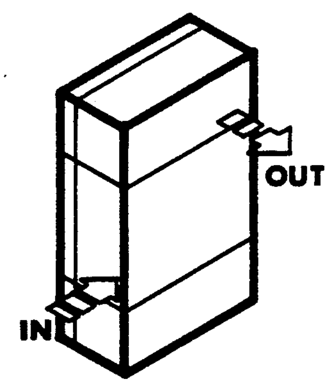
Figure 7G:
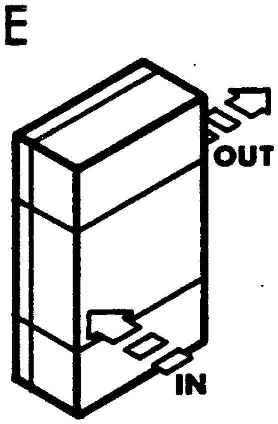
Figure 7H:
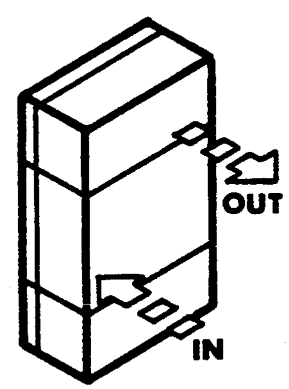

It is important to observe that the vertical lift unit 20 is constructed with all guide tracks, sprockets, drive chains, and carriage-to-chain attachments, rearward of the carriage platform 43. As a result of this arrangement, it is possible to access the carriage platforms 43 from the front, left and right sides without the need to cross or avoid any moving part. It is therefore possible to position the infeed station 32 and the outfeed station 34 at any desired location along the front or side of the intermediate module 88. Articles may be conveyed in at the front and out at the side in a L-configuration as shown schematically in FIGS. 7C and 7G or in at the side and out at the front as shown in FIGS. 7B and 7F; or articles may be conveyed in at the side and out at the side in a Z-configuration as shown in FIGS. 7A and 7E or articles may be conveyed in at the front and removed from the front in a C-configuration as shown as shown in FIGS. 7D and 7H. It should be noted that the configurations illustrated schematically in FIGS. 7A–H may be reversed by switching the infeed and outfeed locations and reversing the direction of carriage travel. The vertical lift unit of this invention may thus, with simple modifications, be configured to suit a great number of conveying conditions.

The versatility of infeed and outfeed configuration is supported by two types of multi-tined conveyor apparatus. The front loading conveyor 208 employs moving belts 210 and is illustrated at the infeed station 32 in FIG. 12. A side loading conveyor 212 employing driven rollers 214 is illustrated at the outfeed station 34 in FIG. 1.

The infeed station 32 will typically be supplied with articles 30, such as trays loaded with mail, by a conventional horizontal roller conveyor 216. Three inch high solenoid driven pop-ups 218 are located at the entrance to the front loading conveyor 208. The pop-ups are electronically controlled to halt the stream of articles 30 into the front loading conveyor 208 until the previous carriage 22 is sufficiently elevated above the belts 210 to allow the introduction of an article. A photodetector 220 and reflector 222 are mounted at the entrance to the conveyor 208 forward of the pop-ups 218. The photodetector 220 alerts an electronic controller (not shown) of the presence of an article ready to be conveyed into the vertical lift unit 20. The controller will typically be a digital computer such as the SLC-500 programmable logic controller manufactured by Alan Bradly of Milwaukee, Wisc. A limit switch 226 is mounted to the intermediate module frame 88 in a position to be tripped by the horizontal platform bar 40 when the platform 43 of the carriage has been sufficiently elevated above the front loading infeed conveyor 208 to provide a sufficient window for introduction of a new article 30. When the limit switch 226 is tripped, the controller lowers the pop-up 218 and an article 30 is driven onto the belts 210. In order to pull a gap between the articles advancing on the horizontal conveyor 216 and the article 30 to be conveyed, the belts 210 will typically be driven at a higher rate than the rollers of the horizontal conveyor 216. For example, while the horizontal conveyor rollers might advance an article at 160 feet per minute, the front loading conveyor belts 210 would advance the article at 200 feet per minute.

The front loading conveyor 208 has four standard H-pitch and 1½" wide timing belts 210. The belts 210 are driven by four connected drive sprockets 228 located forward of the pop-ups 218. When loaded the belts 210 are supported by formed 12 gauge sheet steel tines 230 which are rigidly connected to a transverse bar 232 which is fixed to the intermediate module frame 88. Fixed half-moon material "S" returns 234 are connected to the end of each tine 230 and the belts 210 turn around these returns 234. Mechanical stops 236 are fixed in place beyond the returns 234 to halt the article 30 once it is in position on the infeed conveyor 208. The returns 234 and the drive sprockets 228 are dimensioned so that the belts 210 travel above the surface of the tines 230 when the belts 210 are not loaded.

A photoelectric eye 238 and reflector 240 are mounted on the intermediate module frame 88 close to the furthest extension of the infeed tines 230 to detect the presence of an article and to send an instruction to the controller to halt the advancement of the belts 210 once the article is in position to be elevated.

When an article is positioned on the belts 210 within the intermediate module 88 of the vertical lift unit 20, it will be elevated by engagement with the tines 42 of the carriage platform 43 as the drive chains 24, 26 lift the carriage 22 up past the infeed tines 230. The infeed tines 230 are spaced to fit within the tines 42 of the carriage 22.

A jam-sensing photoelectric eye 242 and reflector 244 are mounted on vertical members 246 of the intermediate module 88 at a position higher than the maximum height of an article and forward of the tines 42 of the carriage 22. If for some reason an article has not been correctly positioned on the carriage platform 43 such that it extends unacceptably the photodetector 242 will detect this undesireable condition and instruct the controller of the jammed condition with the result that the controller will shut down the vertical lift unit 20 until the jam can be manually cleared.

Four positioning rods 248 extend vertically above the front loading conveyor 208 and run the length of the intermediate module 88 and extend into the top module 86. The positioning rods 248 are outwardly curved at their lower ends and serve to urge an article 30 being elevated on the carriage platform 43 into a desired front-to-back position.

As shown in FIGS. 1 and 6, the side loading conveyor 212 is mounted to the intermediate module 88 at a position higher than the infeed station 32. An article 30 which has been fed into the vertical lift unit 20 at the infeed station 32 is carried by the carriage 22 into the top module where it is directed downward where it comes into contact with the rollers 214 of the side loading conveyor 212. The rollers 214 extend from bearings 250 which are fixed to a horizontal member 252 of the intermediate module 88 and mechanically engaged to be driven in unison. The rollers 214 are one inch diameter bar with silicone rubber covering. Five rollers 214 are spaced on 4½" centers such that they interdigitate with the tines 42 of the downwardly moving carriage platform 43. Two rollers 258 are more closely spaced and rotate to convey an article outside the intermediate module 88.

A photoelectric eye 260 and reflector 262 are positioned above the outfeed rollers 214 within the intermediate module 88 to detect the passage of a carriage platform 43. A photoelectric eye 264 and reflector 266 are mounted on the take-away conveyor 268 to detect the discharge of an article 30. The rollers 214, 258 are driven by an electric motor 270.

As carriages 222 loaded with articles move downwards through the intermediate module 88, the articles 30 supported on the carriage platform 43 will be deposited on the outfeed conveyor 212 and will be conveyed to the take-away conveyor 268 while the tines 42 pass through the rollers 214.

It is important to note that although the front feed conveyor has been illustrated as an infeed conveyor, it may serve as an outfeed conveyor as in the configurations illustrated in FIGS. 7B, 7D, 7F and 7H. Also, although the side feed conveyor has been illustrated as an outfeed conveyor, it may serve as an infeed conveyor as in the configurations illustrated in FIGS. 7A, 7B, 7E and 7F.

The vertical lift unit 20 may, as part of a continuous conveyor assembly, elevate 25 to 45 articles per minute. The provisions which have been made for stabilizing the carriages and retaining the carriage platforms in a consistently horizontal plane result in smooth and reliable operation of the apparatus. The geometry of the vertical lift unit 20 also results in a minimum footprint on the shop floor and placement of the infeed station at a desirable low elevation.

It is understood that the invention is not limited to the particular construction and arrangement of parts herein illustrated and described, but embodies all such modified forms thereof as come within the scope of the following claims.

We claim:

1. A vertical lift unit comprising:

a) a carriage having a vertical member and a plurality of tines extending from the vertical member in a substantially horizontal plane, the tines being spaced horizontally from one another and being adapted to support a conveyed article thereon;

b) a horizontal bar rotatably connected to the carriage;

c) two continuous drive chains connected to the bar at spaced connections, the two drive chains extending in vertical planes spaced rearwardly of the carriage tines;

d) a center guide roller rotatably mounted between the vertical member and the bar and rotatable in a plane substantially parallel to the planes of the drive chains;

e) a bearing wheel rotatably mounted to the horizontal bar and rotating in a plane perpendicular to the plane of rotation of the center roller; and f) a support structure having spaced center tracks with portions defining a closed looped center roller guideway, wherein the center roller is engaged between the center tracks and adapted to be conveyed along the center roller guideway by the drive chains, and wherein the bearing wheel engages with one of the center tracks.

2. The vertical lift unit of claim 1 further comprising:

a) a horizontal carriage member rigidly connected to the vertical member beneath the center guide roller, wherein the tines extend from the horizontal member;

b) a left side guide roller rotatably mounted to the left side of the horizontal carriage member and a right side guide roller rotatably mounted to the right side of the horizontal member;

c) a plurality of side guide roller tracks mounted to the support structure, the side tracks defining a closed looped side roller guideway, wherein the side guide rollers are engaged against the side tracks.

3. The vertical lift unit of claim 2 wherein each side guide roller comprises:

a) two annular plastic flanges; and b) an annular plastic interior mounted coaxially with and between the flanges.

4. The vertical lift unit of claim 2 wherein the side guide roller tracks are spaced frontwardly of the center guide roller tracks.

5. The vertical lift unit of claim 2 wherein the side tracks comprise an inner side track spaced from an outer side track; and further comprising:

a) a portion of the inner side guide track which defines a lower curved track portion;

b) a linear member pivotally connected to the support structure and spring-loaded to engage against a side roller of a traveling carriage to force the opposing carriage side roller into engagement with the curved portion of the inner side track.

6. The vertical lift unit of claim 5 wherein the linear member has two segments spaced on either side of a side guide roller track, and the side guide rollers have flanges which protrude beyond the side guide roller guideway which are adapted to engage against the spaced segments of the spring-loaded linear member.

7. The vertical lift unit of claim 1 wherein the center tracks comprise upper track portions and lower track portions, and the support structure comprises an upper support structure to which the upper track portions are connected and a lower support structure to which the lower track portions are connected, and further comprising:

a) a slip joint formed between each upper track portion and its corresponding lower track portion, the slip joint comprising four protruding corner extensions extending from a track, the exterior surfaces of the extensions being substantially coplanar with the adjacent surfaces of the track, and the slip joint further comprises a cross-shaped protrusion extending from a corresponding track, and the protrusion exterior surfaces are substantially coplanar with the adjacent surfaces of the track from which the protrusion extends, and wherein the corner extensions on the one track are engaged with the cross-shaped protrusion on a corresponding track such that the engaged upper and lower tracks provide exterior surfaces with coplanar portions adapted for smooth engagement of the center guide roller traveling thereon; and b) a plurality of jack bolts extending between and connecting the upper support structure to the lower support structure, such that the connected support structure portions may be spaced one from the other to take up slack in the chain while continuing to provide a smooth track for the guide roller.

8. The vertical lift unit of claim 1 further comprising:

a) a plurality of rigid tines fixed to the support structure so as to interdigitate with the tines of a carriage conveyed vertically; and b) a rotatable belt traveling over each fixed tine, the belts being driveable in unison to introduce an article into the path of a conveyed carriage such that the carriage tines may engage with the article and lift the article from the rotatable belts.

9. The vertical lift unit of claim 1 further comprising:

a) a plurality of bearings fixed to the support structure forwardly of the carriage;

b) a plurality of rotatable rollers extending from the fixed bearings and defining a substantially horizontal plane, wherein the rollers are horizontally spaced from one another to interdigitate with the tines of a downwardly moving carriage such that an article conveyed by the carriage will be deposited on the rollers, the rollers being driveable in unison to advance the deposited article out of the vertical lift unit.

10. The vertical lift unit of claim 1, further comprising a drive engaged with the drive chains and adapted to drive the chain to alternatively elevate or lower articles.

11. A vertical lift unit, comprising:

a) two parallel drive chains, driven in vertical planes;

b) a horizontal bar extending between and connecting the two drive chains;

c) a center guide roller rotatably mounted to the horizontal bar forward of both drive chains and rotatable about an axis perpendicular to the planes of the chains;

d) a support structure having a plurality of sprockets mounted thereon which are engaged in driving relationship with the chains;

e) a center roller guide tracks fixed to the support structure, the track having portions defining a substantially closed center roller guideway, wherein the center guide roller is engaged with the center track and is adapted to be driven by the drive chains along the center roller guideway; and f) a carriage rotatably mounted to the horizontal bar forward of the drive chains, the carriage having a plurality of tines which extend outwardly away from the center roller guide track, wherein the tines define a surface adapted for the conveyance of articles deposited thereon, such that rotation of the drive chains by the sprockets will force the carriage and any articles placed on the carriage tines to travel along the path defined by the center guideway.

12. The vertical lift unit of claim 11 wherein the carriage has a vertical member pivotally mounted to the horizontal bar, and further comprising:

a) a horizontal carriage member rigidly connected to the vertical member beneath the center guide roller, wherein the tines extend from the horizontal member;

b) a left side guide roller rotatably mounted to the left side of the horizontal carriage member and a right side guide roller rotatably mounted to the right side of the horizontal member;

c) a plurality of side guide roller tracks mounted to the support structure, the side tracks defining a closed side roller guideway, wherein the side guide rollers are engaged against the side tracks.

13. The vertical lift unit of claim 12 wherein each side guide roller comprises:

a) two annular plastic flanges; and b) an annular plastic interior mounted coaxially with and between the flanges.

14. The vertical lift unit of claim 12 wherein the side guide roller tracks are spaced frontwardly of the center guide roller tracks.

15. The vertical lift unit of claim 12 wherein the side tracks comprise an inner side track spaced from an outer side track; and further comprising:

a) a portion of the inner side guide track which defines a lower curved track portion;

b) a linear member pivotally connected to the support structure and spring-loaded to engage against a side guide roller of a traveling carriage to force the opposing carriage side guide roller into engagement with the curved portion of the inner side track.

16. The vertical lift unit of claim 15 wherein the linear member has two segments spaced on either side of a side guide roller track, and the side guide rollers have flanges which protrude beyond the side guide roller guideway which are adapted to engage against the spaced segments of the spring-loaded linear member.

17. The vertical lift unit of claim 11, further comprising a drive engaged with the drive chains and adapted to drive the chain to alternatively elevate or lower articles.

18. The vertical lift unit of claim 11 wherein the center track comprises upper track portions and lower track portions, and the support structure comprises an upper support structure to which the upper track portions are connected and a lower support structure to which the lower track portions are connected, and further comprising:

a) a slip joint formed between each upper track portion and its corresponding lower track portion, the slip joint comprising four protruding corner extensions extending from one track portion, comprises a cross-shaped protrusion extending from a corresponding track portion, wherein the corner extensions on the one track are engaged with the cross-shaped protrusion on the corresponding track such that the engaged upper and lower tracks provide exterior surfaces with coplanar portions adapted for smooth engagement of the center guide roller traveling thereon.

19. The vertical lift unit of claim 11 further comprising:

a) a plurality of rigid tines mounted to the support structure so as to interdigitate with the tines of a carriage conveyed vertically; and b) a rotatable belt traveling over each fixed tine, the belts being driveable in unison to convey an article deposited by a carriage on the belts such that the article is conveyed out of the vertical lift unit.

20. The vertical lift unit of claim 11 further comprising:

a) a plurality of bearings fixed to the support structure forwardly of the carriage;

b) a plurality of rotatable rollers extending from the fixed bearings and defining a substantially horizontal plane, wherein the rollers are horizontally spaced from one another to interdigitate with the tines of an upwardly moving carriage such that an article conveyed by the rotating rollers will be deposited on the carriage tines.

21. A vertical lift unit comprising:

a) a rigid top module frame, two spaced center guide roller tracks connected to the frame and having portions defining a center roller guideway having an upwardly extending portion joined to a downwardly extending portion by a horizontal portion with radiused corners, and two spaced side guide roller tracks connected to the frame, the side tracks having portions defining a side roller guideway having an upwardly extending portion joined by a horizontal portion to a downwardly extending portion, the side tracks being spaced frontwardly from the center guide roller tracks, and a plurality of sprockets rotatably mounted to the top module frame and rotatable in planes parallel to the center roller guideways;

b) at least one rigid intermediate module frame with two pairs of spaced center guide roller tracks connected to the intermediate module frame, one pair having portions defining an upwardly extending center roller guideway and the other pair having portions defining a separate downwardly extending center roller guideway, and having two pairs of spaced side roller guide tracks connected to the intermediate module frame one pair having portions defining an upwardly extending side roller guideway the other pair having portions defining a separate downwardly extending side roller guideway, wherein the upwardly extending center roller tracks of the intermediate module are connected to the upwardly extending center guide roller tracks of the top module and the downwardly extending center roller tracks of the intermediate module are connected to the downwardly extending center roller tracks of the top module and the side guide roller tracks of the intermediate module are connected to the side guide roller tracks of the top module to form a continuous side roller guideway and the tracks of the top module are connected to the tracks of the intermediate module by slip joints;

c) a rigid bottom module frame, a plurality of sprockets rotatably mounted to the frame beneath the top-module-mounted sprockets and at least one continuous drive chain engaged with the top module and bottom module sprockets, with two center guide roller tracks connected to the bottom module frame and defining a center roller guideway having a downwardly extending portion and an upwardly extending portion joined by a horizontal portion, and having two bottom module mounted side roller tracks having portions defining a side roller guideway having an upwardly extending portion joined by a horizontal portion to a downwardly extending portion, the side roller tracks being spaced frontwardly from the center guide roller tracks, and the tracks of the bottom module are connected to the tracks of the intermediate module to form a continuous center roller guideway and a continuous side roller guideway, wherein the connected modules form an integral structural frame with a continuous center guide roller guideway and a continuous side roller guideway, the guideways being adapted to guide a carriage attached to a drive chain and having a center guide roller and a plurality of side guide rollers along a closed looped path, and wherein the center module framework is adapted to permit the infeed of articles from the front or the side of the module and the outfeed of the conveyed articles from the front or the side, and at least one of the sprockets is driveable to advance the chain engaged thereon to move the carriage connected thereon along a closed looped path.

22. A vertical lift unit comprising:

a) a rigid structural frame;

b) at least one continuous flexible drive member mounted to the frame and adapted to be driven along a continuous path;

c) an outer side guide roller track connected to the frame and extending in a vertical plane;

d) an inner side guide roller track connected to the frame in substantially the same plane as the outer side guide roller track and spaced inwardly from the outer side guide roller track, the inner side guide roller track having a curved portion at its lower extension;

e) a carriage pivotally connected to the drive member and having opposed left and right side guide rollers which are rotatably mounted to the carriage, each side roller engaging against a side track; and f) an extended linear member pivotally connected to the frame and spring-loaded to engage against a side roller of a traveling carriage to force the opposing carriage side roller into engagement with the curved portion of the inner side track.

23. The vertical lift unit of claim 22 wherein the linear member has two segments spaced on either side of a side guide roller track, and the side guide rollers have flanges which protrude beyond the side roller guideway which are adapted to engage against the spaced segments of the spring-loaded linear member.

24. The vertical lift unit of claim 22 wherein the linear member is pivotally connected to the frame above the point of engagement of the member with the side roller and the linear member is adapted to urge a downwardly traveling carriage against the curved portion of the inner side guide roller track.

25. A vertical lift unit comprising;

a) an upper frame;

b) a lower frame beneath the upper frame;

c) a plurality of upper guide tracks connected to the upper frame and having a plurality of planar exterior surfaces;

d) a plurality of lower guide tracks connected to the lower frame and having a plurality of planar exterior surfaces and located beneath and corresponding to the upper guide track;

e) a plurality of sprockets rotatably mounted to the upper frame;

f) a plurality of sprockets mounted to the lower frame;

g) at least one continuous chain engaging an upper sprocket and a lower sprocket;

h) a slip joint formed between each upper guide track and its corresponding lower guide track, the slip joint comprising four protruding corner extensions extending from a track, the exterior surfaces of the extensions being substantially coplanar with the adjacent surfaces of the track, and the slip joint further comprises a cross-shaped protrusion extending from a corresponding track, the protrusion exterior surfaces being substantially coplanar with the adjacent surfaces of the track from which the protrusion extends, and wherein the corner extensions on the one track are engaged with the cross-shaped protrusion on a corresponding track such that the engaged upper and lower tracks provide exterior surfaces with coplanar portions adapted for smooth engagement of a guide roller traveling thereon and such that the upper frame may be raised above the lower frame to take up slack in the chain while continuing to provide a smooth track for a guide roller traveling thereon.

26. The vertical lift unit of claim 25 further comprising:

a) a plurality of corner plates connected to the upper frame;

b) a plurality of corner plates connected to the lower frame, the lower frame corner plates being spaced directly below the upper frame corner plates; and c) at least one threaded jacking bolt extending between and connecting each pair of upper and lower corner plates, and the corner plates having portions defining threaded holes to engage with the jacking bolts, such that rotation of the jacking bolts elevates the upper frame above the lower frame.

* * * * *